United States Patent
Fruehauf et al.

[19]

[11] Patent Number: 6,037,731
[45] Date of Patent: Mar. 14, 2000

[54] METHOD FOR ADAPTING AS A FUNCTION OF THE DRIVING SITUATION AND DRIVING STYLE, THE SIDE SUPPORT OF A PERSON SITTING IN A VEHICLE SEAT, AND A VEHICLE SEAT FOR THIS PURPOSE

[75] Inventors: Frank Fruehauf, Aichwald; Helmut Gimmler, Schwaikheim; Klaus-Peter Kuhn, Pluederhausen; Werner Reichelt, Esslingen; Helge Schmidt-Spalding; Timo Schneider, both of Stuttgart, all of Germany

[73] Assignee: DaimlerChrysler AG, Stuttgart, Germany

[21] Appl. No.: 09/190,223

[22] Filed: Nov. 13, 1998

[30] Foreign Application Priority Data

Nov. 13, 1997 [DE] Germany ............................ 197 50 223

[51] Int. Cl.$^7$ ................................ A47C 7/46; G05B 19/18
[52] U.S. Cl. .................... 318/468; 318/469; 318/265; 318/569; 318/466; 297/284
[58] Field of Search ...................................... 318/280–286, 318/600–632, 265, 266; 297/284 R, 284 E, 284 G, DIG. 3, 468, 330

[56] References Cited

U.S. PATENT DOCUMENTS

| | | | |
|---|---|---|---|
| 4,655,505 | 4/1987 | Kashiwamura et al. | 297/284 |
| 4,722,550 | 2/1988 | Imaoka et al. | |
| 4,924,162 | 5/1990 | Sakamoto et al. | 318/569 |
| 5,129,704 | 7/1992 | Kishi et al. | 297/284 R |
| 5,130,622 | 7/1992 | Takizawa et al. | 318/265 |
| 5,707,109 | 1/1998 | Massara et al. | |

FOREIGN PATENT DOCUMENTS

| | | |
|---|---|---|
| 35 41 537 | 6/1986 | Germany . |
| 35 05 088 | 11/1986 | Germany . |
| 44 01 416 | 7/1995 | Germany . |
| WO 97/48571 | 12/1997 | WIPO . |

*Primary Examiner*—Paul Ip
*Attorney, Agent, or Firm*—Evenson, McKeown, Edwards & Lenahan, PLLC

[57] ABSTRACT

A method is provided for adapting the side support, as a function of the driving situation and driving styles, of a person sitting in the seat of a vehicle, in which method a lateral acceleration acting on the seat is determined as reference variable for the adaptation. In order to allow greater allowance for the way in which the sitting person senses lateral acceleration, as well as a comfortable sitting sensation with the advantages of a necessary side support which is built up in curves at short notice, the specific instantaneous lateral acceleration is weighted with the instantaneous driving speed of the vehicle. A control variable for the degree of adaptation is derived therefrom. In addition, a supplementary control variable is determined which brings about support of the driver on both sides in the seat as a function of the driving style. A vehicle seat in which this method is applied is specified.

21 Claims, 1 Drawing Sheet

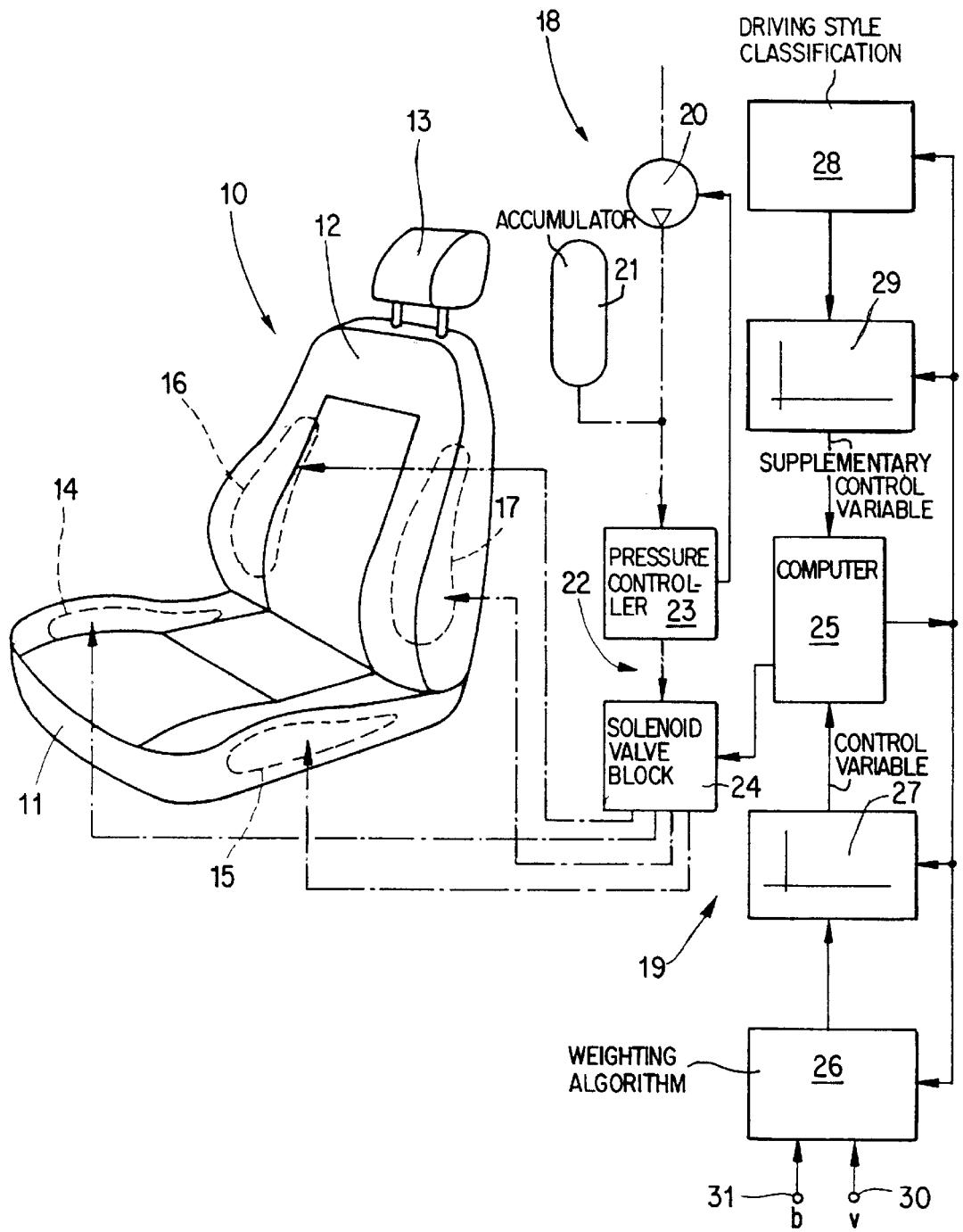

METHOD FOR ADAPTING AS A FUNCTION OF THE DRIVING SITUATION AND DRIVING STYLE, THE SIDE SUPPORT OF A PERSON SITTING IN A VEHICLE SEAT, AND A VEHICLE SEAT FOR THIS PURPOSE

BACKGROUND AND SUMMARY OF THE INVENTION

The invention relates to a method for adapting, as a function of the driving situation and driving style, the side support of a person sitting in the seat of a vehicle, in particular of a passenger car, in which a lateral acceleration acting on the seat is determined as a reference variable for the adaptation, as well as to a vehicle seat with an adaptive side support system.

In a known vehicle seat of the above-mentioned type, such as is disclosed in German Patent document DE 35 05 088 C1, inflatable cushions are formed into the upholstery of the vehicle seat for individually supporting, in particular, the back of the sitting person. Inflatable side cushions are also inserted into the edge areas of the seats for providing adjustable side support. The variable air pressure in the air cushions is set by means of a pressure regulating device. The pressure which is set is fed to the respective air cushions by means of a pressure distribution device. A sensor which generates a signal when there is a prespecified absolute value of the lateral acceleration acting on the vehicle seat causes, when it responds and the side support is not switched on, the side cushions to fill up to a predetermined value. The air cushion control is carried out by means of solenoid valves which vent the cushions in their basic position, and in their working position apply a prespecified air pressure to them from the pressure regulating device.

In this known vehicle seat, the side support is therefore actuated only if the lateral acceleration acting on the seat exceeds a prespecified value, the activation taking place simultaneously in the two edge areas of the seat. The applied support which is set here by pressurizing the side cushions is always configured identically irrespective of the absolute value of the lateral acceleration. If the lateral acceleration drops again below this prespecified value, the side support is eliminated automatically by venting the side cushions.

In a vehicle seat which is likewise known, such as from German Patent document DE 35 41 537 A1, when the vehicle is turning the driver is supported counter to the lateral or transverse acceleration which occurs during such turning in that one of two supporting bellows which are provided laterally in the seat is quickly filled with compressed air if the lateral acceleration exceeds a specific value. In order to determine the lateral acceleration, a control sensor which is arranged in the steering column of the vehicle and a vehicle speed sensor are provided. A processor calculates from the relationship between the control angle of the steering column supplied by the control sensor and the vehicle speed supplied by the vehicle speed sensor, the maximum lateral acceleration occurring during the turning maneuver. If this previously calculated lateral acceleration exceeds a prescribed value, the corresponding supporting bellows are suddenly filled with compressed air.

These known vehicle seats accommodate the desire of many drivers (who prefer a less sporty driving style but, at the same time, demand high levels of seating comfort) for side support which occurs only in specific driving situations, for example in the case of extreme cornering, even though at the same time it adversely affects seating comfort. Investigations have shown that at relatively low speed drivers accept relatively large lateral accelerations without desiring side support, but at a high speed drivers find side support pleasant even when the lateral acceleration is small, but the side support should then preferably only take place on one side, that is on the side of the seat which is on the outside of the turning curve.

The invention is based on the object of specifying a method for adapting the side support as a function of the driving situation and driving style, and for specifying a vehicle seat with such a side support. The method and seat make greater allowance for the ways in which drivers or vehicle occupants sense the lateral acceleration, and thus combine a comfortable sitting sensation with the advantages of the necessity for side support which is established in bends (curves) at short notice.

This and other objects are achieved according to the invention by a method for adapting the side support, as a function of the driving situation and driving style, of a person sitting in the seat of a vehicle, in particular of a passenger car, in which a lateral acceleration acting on the seat is determined as a reference variable for the adaptation. The determined lateral acceleration is weighted with the instantaneous driving speed of the vehicle and a control variable for the degree of adaptation is derived therefrom. A corresponding vehicle seat according to the invention has a seat component and a backrest, as well as an adjustable side support. The side support is formed in the seat component and/or in the backrest, for the sitting person, and has a control unit which performs the adaptation of the side support as a function of a lateral acceleration acting on the seat. The control unit generates a control variable which determines the degree of adaptation from the instantaneous lateral acceleration ($b_Q$) and the instantaneous driving speed (v) by using a stored weighting algorithm which describes the relationship between the driving speed (v) and the lateral acceleration which is perceived by the sitting person.

The method and the vehicle seat according to the invention have the advantage that by taking into account the vehicle speed during the generation of the control variable for the side support, which is preferably on one side of the seat, the vehicle seat gradually adapts automatically to the lateral acceleration which is sensed or perceived by the driver as a function of a particular driving situation. Thus, the advantages of a comfortable seat, combined with the advantages of a sport-type seat, are made available to the sitting person. The adjustment of the sitting properties takes place automatically and does not distract the driver from the events on the road.

Expedient embodiments of the method and vehicle seat according to the invention with advantageous developments and improvements of the invention are described herein.

According to one preferred refinement or embodiment of the invention, the driving style of the driver is classified and a supplementary control variable which is superimposed on the control variable is derived from the result of the classification. The classification of the driving style is carried out as described in German Patent document DE 44 01 416 A1, for example. In this method, the driving style is characterized gradually between steady and dynamic. The sitting comfort of the vehicle seat and the sitting sensation of the occupant are also additionally automatically adapted to the current driving style. A sporty, dynamic driving style then leads automatically to side support being provided on both sides of the seat, whereas in the case of a steady driving style the side support on both sides is eliminated. Classification results of the driving style classification which lie in between these styles lead to a greater or lesser degree, i.e. a more or less perceptible degree of side support on both sides.

Other objects, advantages and novel features of the present invention will become apparent from the following detailed description of the invention when considered in conjunction with the accompanying drawings.

BRIEF DESCRIPTION OF THE DRAWING

FIG. 1 illustrates an exemplary embodiment according to the invention in which a driver's seat for a passenger car has a control unit for controlling the side support in the driver's seat by means of a pneumatic system.

DETAILED DESCRIPTION OF THE DRAWING

The driver's seat 10, which is illustrated in a perspective view in the drawing as an exemplary embodiment of a general driver's seat for a passenger car, has an upholstered seat component 11 and an upholstered backrest 12. A headrest 13 protrudes from the backrest 12. In order to provide side support to the driver, lateral bulges, into each of which an air cushion 14, 15 and 16, 17 is integrated, are formed in the upholstery of the seat component 11 and backrest 12. When the air cushions 14–17 are completely inflated, maximum side support of the driver is achieved in the lap and back areas, which support can be decreased by reducing the air pressure in the air cushions 14–17. The air cushions 14–17 are connected to a pneumatic system 18 which supplies the air cushions 14–17 with compressed air. The air pressure, and thus the degree of side support, are controlled by a control unit 19. The pressure lines within the pneumatic system 18 and those leading to the air cushions 14–17 are shown in the drawing by dot-dashed lines and the control and signal lines of the control unit 19 are shown by unbroken lines.

In this driver's seat 10, the adaptation of the side support of the driver's seat 10 as a function of the driving situation and driving style through the use of the control unit 19 is carried out according to the method described below:

The lateral acceleration $b_Q$ acting instantaneously on the vehicle seat is measured or is calculated from the wheel speeds and is weighted with the instantaneous driving speed v of the passenger car. The weighting is carried out here by means of an algorithm which transforms the lateral acceleration into a lateral acceleration which is sensed by the driver as function of the driving speed. A control variable, which causes the pneumatic system 18 to feed a corresponding air pressure into one side of the air cushions 14 and 16 or 15 and 17, depending on which pair of air cushions is on the outside of the bend during cornering, is extracted, by means of the instantaneous lateral acceleration which has been transformed into the sensed lateral acceleration, from a characteristic curve which prescribes a logical linking of the sensed lateral acceleration and a degree of side support which has been determined as desirable for the sensed lateral acceleration.

In addition, the driving style of the driver or vehicle driver is classified in the control unit 19. Such a classification of driving styles is described, for example, in German Patent document DE 44 01 416 A1. The classification outline extends here from a steady driving style to a sporty, dynamic driving style and may assume any desired intermediate levels. A supplementary control variable, which is superimposed on the control variable, is derived from the classification result which characterizes the individual driving style of the vehicle driver. The supplementary control variable is extracted here again from a characteristic curve which prescribes a logical linking of driving styles and a degree of side support which has been determined as desirable for said styles. As a function of this supplementary control variable, the pneumatic system 18 sets, in all four air cushions 14–17, a basic pressure level which remains unchanged if the driving style is maintained. During cornering, the air pressure in the pairs of cushions on the outside of the curve, which pressure has been determined by the control variable, is superimposed on this basic pressure level.

In the vehicle seat illustrated in the drawing, the pneumatic system 18 comprises a compressed air pump 20, a compressed air accumulator 21 and a compressed air regulating device 22 which is connected to the latter and is controlled by the control unit 19. The compressed air regulating device 22 comprises a pressure controller 23, which switches the compressed air pump 20 in order to maintain a constant excess pressure at the input side, and a solenoid valve block 24, which distributes the input pressure to the four air cushions 14–17 in accordance with the values prescribed by the control unit 19. The system of pressure regulation which is integrated therein also provides the possibility of reducing the pressure in the air cushions 14–17 by venting the air cushions.

The control unit 19 comprises a central control computer 25 and the processing blocks 26–29 which are controlled thereby. The control unit 19 is also connected to sensors 30, 31, the sensor 30 measuring the current vehicle speed v, and the sensor 31 measuring the current lateral acceleration $b_Q$ acting on the vehicle seat. The current lateral acceleration can also be calculated from the difference between the wheel speeds of the vehicle.

In the block 26, a weighting algorithm is stored which describes the relationship between the vehicle speed v and the lateral acceleration which is "sensed" by the driver. Using this algorithm, the instantaneous lateral acceleration $b_Q$ is transformed into a "sensed" lateral acceleration. This allows for the phenomenon, described above, according to which the driver accepts a large lateral acceleration at a low speed without desiring side support, and at a high speed considers side support desirable even at low lateral acceleration values. In block 27, a first characteristic curve is stored, which prescribes a logical linking of "sensed" lateral acceleration and a degree of side support on one side which is determined as desirable for this acceleration. In block 26, the sensed lateral acceleration is determined from the instantaneous lateral acceleration $B_Q$ and the instantaneously measured vehicle speed v, and a control variable is fed, as an electrical signal, from the central control computer 25 to the pressure regulating device 22—and there to the solenoid valve block—in order to set the output pressure.

In block 28, the driving style of the vehicle driver is classified, as described, for example, in German Patent document DE 44 01 416 A1. In block 29, a second characteristic curve is stored which prescribes a logical linking of driving styles and a degree of side support which is determined as desirable for said styles. A supplementary control variable is read from said characteristic curve in block 29 by means of the result of the classification and is again fed, as an electrical signal, from the central control computer 25 to the solenoid valve block 24, which sets a corresponding output pressure.

The supplementary control variable causes the pressure in the pneumatic system 18 to be set, said level being adjusted, with the actuation of the solenoid valve block 24, in all four air cushions 14–17 in the driver's seat 10, and resulting in a it basic degree of side support adapted to the driving style of the driver in the seat 10. After this basic pressure has been set in all four air cushions 14–17, the solenoid valves in the solenoid valve block 24 are transferred into their pressure maintaining position by the central control computer 25. During cornering, the control variable which is determined as described above is fed from the block 27 to the control computer 25. The control variable and the supplementary control variable are electrically linked in the control computer 25, and the electrical signal which is fed to the solenoid valve block 24 brings about in the pneumatic system 18 an air pressure setting which corresponds to the superimposition of the control variable and supplementary control variable. Depending on the direction of the lateral acceleration $b_Q$, the control computer 25 now actuates one of the two solenoid valves in the solenoid valve block 24. As a result, the pressure in the two air cushions 14 and 16 or 15 and 17, lying on the outside of the curve, of the seat component 11 and backrest 12 is adjusted to the higher air pressure, while the pressure level in the two other air cushions lying on the inside of the curve continues to correspond to the basic pressure which was set previously on the basis of the driver's driving style which was determined.

A central computer 25 which controls the adaptation of the side support system can be software controlled as described above. Of course, it will readily be understood that the control functions can be performed by software, hardware or any combination thereof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting a side support of a vehicle seat, as a function of a driving situation and a driving style, for a person sitting in the seat, the method comprising the acts of:

determining a lateral acceleration acting on the seat as a reference variable;

determining an instantaneous driving speed of the vehicle; and weighting the determined lateral acceleration with the instantaneous driving speed of the vehicle to transform the determined lateral acceleration into a sensed lateral acceleration which is sensed by a person sitting in the seat as a function of the driving speed to drive a control variable for controlling a degree of adjustment of the side support.

2. The method according to claim 1, wherein the weighting act is carried out by an algorithm.

3. The method according to claim 2, wherein the control variable is extracted from a first characteristic curve which describes a logical linking of the sensed lateral acceleration and a degree of side support on one side of the seat which is determined as desirable for said acceleration.

4. The method according to claim 1, wherein the driving style of the vehicle driver is classified and a supplementary control variable which is superimposed on the control variable is derived from a result of the classification.

5. The method according to claim 2, wherein the driving style of the vehicle driver is classified and a supplementary control variable which is superimposed on the control variable is derived from a result of the classification.

6. The method according to claim 3, wherein the driving style of the vehicle driver is classified and a supplementary control variable which is superimposed on the control variable is derived from a result of the classification.

7. The method according to claim 4, wherein the supplementary control variable is extracted from a second characteristic curve which prescribes a logical linking of driving styles and a degree of side support on both sides of the seat which is determined as desirable for said driving styles.

8. The method according to claim 5, wherein the supplementary control variable is extracted from a second characteristic curve which prescribes a logical linking of driving styles and a degree of side support on both sides of the seat which is determined as desirable for said driving styles.

9. The method according to claim 6, wherein the supplementary control variable is extracted from a second characteristic curve which prescribes a logical linking of driving styles and a degree of side support on both sides of the seat which is determined as desirable for said driving styles.

10. The method according to claim 3, wherein the side support is implemented by air cushions with adjustable air pressure which are integrated in at least one of the seat surface and backrest of the seat, and further wherein variables which are proportional to pressure values which are to be set in the air cushions are specified in the first characteristic curve as a measure of the side support, and still further wherein the pressure value corresponding to the supplementary control variable is applied in all the air cushions, and the pressure value corresponding to the control variable is applied exclusively in the air cushions which respectively lie on the outside of the seat during cornering.

11. The method according to claim 4, wherein the side support is implemented by air cushions with adjustable air pressure which are integrated in at least one of the seat surface and backrest of the seat, and further wherein variables which are proportional to pressure values which are to be set in the air cushions are specified in the first characteristic curve as a measure of the side support, and still further wherein the pressure value corresponding to the supplementary control variable is applied in all the air cushions, and the pressure value corresponding to the control variable is applied exclusively in the air cushions which respectively lie on the outside of the seat during cornering.

12. The method according to claim 7, wherein the side support is implemented by air cushions with adjustable air pressure which are integrated in at least one of the seat surface and backrest of the seat, and further wherein variables which are proportional to pressure values which are to be set in the air cushions are specified in the first and second characteristic curves as a measure of the side support, and still further wherein the pressure value corresponding to the supplementary control variable is applied in all the air cushions, and the pressure value corresponding to the control variable is applied exclusively in the air cushions which respectively lie on the outside of the seat during cornering.

13. A vehicle seat side support adjusting system for a person sitting in the vehicle seat, comprising:

a seat component;

a backrest;

an adjustable side support system formed in at least one of the seat component and the backrest;

a control unit which adjusts the adjustable side support as a function of a lateral acceleration acting on the vehicle seat, said control unit generating a control variable which determines a degree of adjustment from an instantaneous lateral acceleration and an instantaneous driving speed using a stored weighting algorithm which describes a relationship between the driving speed and a sensed lateral acceleration sensed by the sitting person.

14. The vehicle seat according to claim 13, wherein the control unit generates a supplementary control variable, which determines a basic measure of adaptation, from a driving style of a vehicle driver, which it classifies by using characteristic variables.

15. The vehicle seat according to claim 13, wherein a first characteristic curve which describes a logical linking of sensed lateral acceleration and a degree of side support on one side of the seat which is determined as desirable for said lateral acceleration is stored in the control unit, and wherein the control unit reads the control variable from the first characteristic curve by reference to the sensed lateral acceleration which has been determined.

16. The vehicle seat according to claim 14, wherein a first characteristic curve which describes a logical linking of sensed lateral acceleration and a degree of side support on one side of the seat which is determined as desirable for said lateral acceleration is stored in the control unit, and wherein the control unit reads the control variable from the first characteristic curve by reference to the sensed lateral acceleration which has been determined.

17. The vehicle seat according to claim 14, wherein a second characteristic curve which describes a logical linking of standardized driving styles and a degree of side support on both sides of the seat which is determined as desirable for said driving styles is stored in the control unit, and wherein the control unit outputs the supplementary control variable from the second characteristic curve by reference to the classified driving style.

18. The vehicle seat according to claim 15, wherein a second characteristic curve which describes a logical linking of standardized driving styles and a degree of side support on both sides of the seat which is determined as desirable for said driving styles is stored in the control unit, and wherein the control unit outputs the supplementary control variable from the second characteristic curve by reference to the classified driving style.

19. The vehicle seat according to claim 13, wherein the adjustable side support system comprises:

air cushions integrated in lateral bulges of the seat component and/or the backrest in order to provide side support; and a compressed air regulating device for adjusting the air pressure of the air cushions, wherein the control variable and supplementary control variable are fed as electrical control signals to the compressed air regulating device, and wherein the compressed air regulating device applies a pressure value, corresponding to the supplementary control variable, in all the air cushions, and a pressure value, corresponding to the control variable, exclusively to the air cushions which lie on the outside of the seat during cornering.

20. The vehicle seat according to claim 19, wherein the compressed air regulating device includes a pressure controller, a compressed air pump and a compressed air accumulator, the pressure controller providing an excess pressure which adjusts pressure in the air cushions via a solenoid block.

21. The vehicle seat according to claim 20, wherein the electrical control signals, which represent the control variable and supplementary control variable, of the control unit are present at the solenoid valve block which is designed to inflate and vent the air cushions and to maintain pressure.

* * * * *